Aug. 9, 1927.
L. D. COLLAR
1,638,619
PACKING GLAND STRUCTURE
Filed Nov. 25, 1925
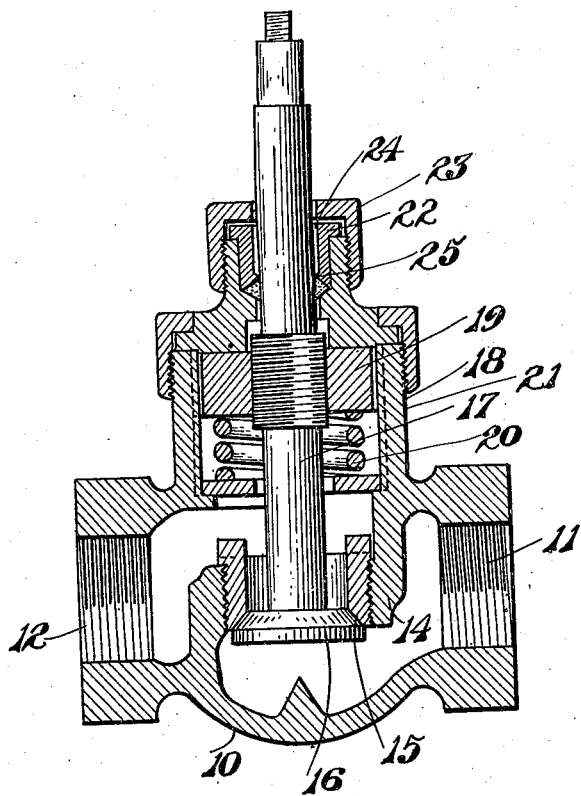
INVENTOR.
LLOYD. D. COLLAR
BY
ATTORNEYS.

Patented Aug. 9, 1927.

1,638,619

UNITED STATES PATENT OFFICE.

LLOYD D. COLLAR, OF OAKLAND, CALIFORNIA, ASSIGNOR TO COLLAR VALVE CORPORATION, OF OAKLAND, CALIFORNIA, A CORPORATION OF CALIFORNIA.

PACKING-GLAND STRUCTURE.

Application filed November 25, 1925. Serial No. 71,322.

This invention relates to valves and particularly pertains to a stem packing gland for valves.

It is the principal object of the present invention to provide a stem packing gland for valves which will maintain a fluid tight joint around the stem, eliminate friction between the stem and gland, thus preventing wearing of the stem, and which will permit the valve to automatically center itself relative to its seat.

One form which the invention may assume is exemplified in the following description and illustrated by way of example in the accompanying drawings, in which:

The figure is an enlarged central vertical section through a self grinding valve disclosing the invention applied thereto.

Referring more particularly to the accompanying drawings, 10 indicates a valve body having inlet and outlet openings 11 and 12. A partition wall 14 separates the connections 11 and 12 and is formed with a valve aperture having a seat 15. A valve 16 cooperates with the seat and is formed with a stem 17 which extends outwardly through a bonnet assembly 18 on the valve body. This stem is threadedly connected to a stem block 19 which is reciprocable and which operates against an expansion spring 20 so that the valve will grind on its seat each time it is opened and closed.

The bonnet assembly of the valve includes a centrally bored bonnet 21 which is counterbored at its outer end co-axially with the valve stem for the reception of a packing gland 22. This packing gland is adapted to be pressed inwardly into the counterbore in the bonnet by means of a packing nut 23 through which the stem extends and which is adapted to threadedly engage with the outer end of the bonnet. The gland 22 is formed with a central bore 24 which is of a greater diameter than the valve stem. At its inner end the gland is formed with an inwardly projecting annular lip 25, the interior diameter of which is but slightly greater than the diameter of the valve stem.

When packing is interposed between the inner end of the gland and the end of the counterbore in the valve bonnet, the pressure exerted by the nut 23 on the gland causes the valve stem to automatically center in the gland and form a fluid tight joint around the valve stem to prevent leakage therealong. The small surface area of the lip 25 in the gland permits the valve stem to move slightly from a true axial path when necessary to properly seat the valve. Thus the effect of the gland will be to permit the valve to automatically adjust itself to its seat and also to form a fluid tight joint about the stem.

With the exception of the lip 25, the bore in the gland is considerably greater than the valve stem and will not contact therewith, thus eliminating friction and preventing wearing of the stem which occurs when the valve stem is constantly frictionally engaged by the bore in the packing gland.

It is seen that by the use of my present invention the valve will be of longer life. As there is no tendency to wear on the valve stem, repacking of the valve will be required but very infrequently. Also, the valve will be permitted to slightly deviate from a true axial path when the valve is opened and closed so that it will properly seat at all times.

While I have shown my packing structure in connection with a self grinding globe valve, it is to be understood that it may be used in various other arts without departing from the invention. The present adaptation is illustrated for a clear understanding of the invention only.

While I have shown the preferred form of my invention, it is to be understood that various changes in its construction may be made by those skilled in the art without departing from the spirit of the invention as defined in the appended claim.

Having thus described my invention, what I claim and desire to secure by Letters Patent is:

A packing gland structure for a rotatable or reciprocable member of circular cross section, said gland structure including an element through which said member extends, said element being counter-bored at one end, a packing gland member being formed with a bore considerably larger than the diameter of said member and through which said member extends, said gland adapted to be received by the counter-bore in said element, means adapted to engage with said element and force said gland inwardly with respect to the inner end of said counter-bore, said gland member being formed with an inwardly projecting thin annular lip at its inner end contacting with the sides of the member whereby the latter may pivot slightly with said lip as a pivot point.

LLOYD D. COLLAR.